(12) United States Patent
Ryu et al.

(10) Patent No.: US 9,025,233 B2
(45) Date of Patent: May 5, 2015

(54) DUAL MODE FUNCTION PIXEL AND DUAL MODE FUNCTION DISPLAY INCLUDING THE SAME

(71) Applicant: Electronics and Telecommunications Research Institute, Daejeon (KR)

(72) Inventors: Hojun Ryu, Seoul (KR); Sang Hee Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 141 days.

(21) Appl. No.: 13/677,723

(22) Filed: Nov. 15, 2012

(65) Prior Publication Data

US 2013/0208022 A1     Aug. 15, 2013

(30) Foreign Application Priority Data

Feb. 9, 2012  (KR) .................. 10-2012-0013203

(51) Int. Cl.
    *G09G 5/10*     (2006.01)
    *G02B 26/00*    (2006.01)
    (Continued)

(52) U.S. Cl.
    CPC .............. *G09G 5/10* (2013.01); *G02B 26/001* (2013.01); *G02F 1/157* (2013.01); *G09G 3/3466* (2013.01); *G09G 3/3208* (2013.01); *G09G 2300/046* (2013.01); *G02B 5/201* (2013.01); *G09G 5/00* (2013.01); *G09G 3/2003* (2013.01);
    (Continued)

(58) Field of Classification Search
    CPC .......... G09G 3/3466; G09G 2300/046; G09G 2300/0456; G09G 2300/0473; G09G 5/10; G02B 26/001; G02F 1/157

USPC .................................................. 359/260, 578
See application file for complete search history.

(56) References Cited

U.S. PATENT DOCUMENTS 8,023,169 B2 * 9/2011 Lan .............................. 359/260
8,451,193 B2 * 5/2013 Namm et al. .................. 345/4
(Continued)

FOREIGN PATENT DOCUMENTS

| JP | 2005-128062 A | 5/2005 |
| KR | 10-2008-0091312 A | 10/2008 |
| KR | 1020100090262 A | 8/2010 |
| KR | 1020100133451 A | 12/2010 |

(Continued)

OTHER PUBLICATIONS

Cheong et al., "Transflective Liquid Crystal Display with High Aperture Ratio using Electrophoresis Particles," p. 166-168, IMID 2009 Digest.*

*Primary Examiner* — Quan-Zhen Wang
*Assistant Examiner* — Xuemei Zheng
(74) *Attorney, Agent, or Firm* — Rabin & Berdo, P.C.

(57) ABSTRACT

Disclosed is a dual mode function pixel that operates either in a first mode or in a second mode according to the intensity of a projected light to have a high visibility regardless of the intensity of projected light. The dual mode function pixel includes: a first membrane on which a self-luminescent element is formed; one or more membranes formed to surround the first membrane; and a lower layer formed below the first membrane and the one or more membranes to be spaced apart from the first membrane and the one or more membranes. The dual mode function pixel is controlled such that the self-luminescent element is driven either to emit light in a first mode operation or to selectively reflect a projected light by utilizing an interference of light generated between the first to one or more membranes and the lower layer in a second mode operation.

15 Claims, 3 Drawing Sheets

(51) Int. Cl.
*G02F 1/157* (2006.01)
*G02B 5/20* (2006.01)
*G09G 5/00* (2006.01)
*G09G 3/20* (2006.01)
*G09G 3/22* (2006.01)
*G09G 3/34* (2006.01)
*G09G 3/32* (2006.01)

(52) U.S. Cl.
CPC ............... *G09G 3/22* (2013.01); *G09G 3/3473* (2013.01); *G09G 2300/023* (2013.01); *G09G 2300/0452* (2013.01); *G02F 2201/44* (2013.01)

(56) References Cited

U.S. PATENT DOCUMENTS

| | | | |
|---|---|---|---|
| 2007/0075935 A1* | 4/2007 | Mesmer et al. | 345/76 |
| 2009/0135111 A1* | 5/2009 | Yamamoto et al. | 345/76 |
| 2012/0050975 A1* | 3/2012 | Garelli et al. | 361/679.27 |
| 2013/0135338 A1* | 5/2013 | Gille et al. | 345/596 |

FOREIGN PATENT DOCUMENTS

WO    WO 2009/052326 A2    4/2009
WO    WO 2009/120558 A1    10/2009

\* cited by examiner

DUAL MODE FUNCTION PIXEL AND DUAL MODE FUNCTION DISPLAY INCLUDING THE SAME

CROSS-REFERENCE TO RELATED APPLICATIONS

This application is based on and claims priority from Korean Patent Application No. 10-2012-0013203, filed on Feb. 9, 2012, with the Korean Intellectual Property Office, the disclosure of which is incorporated herein in its entirety by reference.

TECHNICAL FIELD

The present disclosure relates to a pixel that operates in a dual mode and a dual mode function display having a high visibility regardless of the intensity of external light by using the pixel.

BACKGROUND

Displays are generally configured by a set of pixels which can reflect transmitted light, or perform a self-luminescent emission/an emission of light. A display that displays an image by reflecting transmitted light is generally referred to as a reflective display. A liquid crystal display, a micro electro mechanical systems (MEMS) type light modulator display using interference, and an electronic paper display using electrophoresis, are examples for the reflective display. In most reflective displays, external light is projected to the display, and an image is provided by using the interference and reflection of the light.

In contrast, the display that displays an image using the emissive effect/self-luminescent effect includes a display that implements the image by using an auxiliary light source formed on a rear surface of the display and a display that provides the image through a self luminescence of light. The former includes, for example, a liquid crystal display (LCD) and a thin film transistor liquid crystal display (TFT LCD), and the latter includes, for example, a light emitting diode (LED) display and an organic light emitting diode (OLED) display.

Meanwhile, although the reflective display provides a clear image when the intensity of the external light is at an appropriate level, it is very difficult to reproduce the image when the intensity of the external light is too strong or too weak, which is problematic in the reflective display. The luminescent/emissive display provides a very clear image having a high visibility when the intensity of external light is weak or there is no light presents outside the display. However, there is a disadvantage in the luminescent/emissive display in that a proper image is not provided because an image of the display itself is buried by the external light when the intensity of external light is strong.

Therefore, various studies are being conducted on a display and the structure of pixels included in the display that can provide a clear image regardless of the intensity of the external light that presents outside the display.

SUMMARY

The present disclosure has been made in an effort to solve the problems described above and intends to provide a pixel that operate in a first mode in which light is autonomously emitted or in a second mode in which projected light is selectively reflected, and a display that includes the plurality of pixels operating in the first mode or the second mode according to the intensity of light projected from outside, thereby displaying a clear image regardless of the intensity of the light projected from outside.

An exemplary embodiment of the present disclosure provides a dual mode function pixel including: a first membrane on which a self-luminescent element is formed; one or more membranes formed to surround the first membrane; and a lower layer formed below the first membrane and the one or more membranes to be spaced apart from the first membrane and the one or more membranes. In particular, the dual mode function pixel is controlled such that the self-luminescent element is driven either to emit light in a first mode operation or to selectively reflect a projected light by utilizing an interference of light generated between the first to one or more membranes and the lower layer in a second mode operation.

The one or more membranes may include: a second membrane formed to be spaced apart from the first membrane and surround the first membrane; and a third membrane formed to be spaced apart from the second membrane and surround the second membrane.

Another exemplary embodiment of the present disclosure provides a dual mode function display, including: a pixel array including a plurality of pixels that operate either in a first mode in which light is self-emitted or in a second mode in which a projected light is selectively reflected; and a control unit configured to sense the intensity of the projected light to control the plurality of pixels to operate either in the first mode or in the second mode.

According to an exemplary embodiment of the present disclosure, an image is displayed with self-emitting light or selectively reflecting projected light according to the intensity of light projected from outside, thereby displaying a clear image regardless of the intensity of the light projected from outside.

In the following detailed description, reference is made to the accompanying drawing, which form a part hereof. The illustrative embodiments described in the detailed description, drawing, and claims are not meant to be limiting. Other embodiments may be utilized, and changes may be made, without departing from the spirit or scope of the subject matter presented in the disclosure.

DETAILED DESCRIPTION

The object, features and advantages will be described with reference to the accompanying drawings and thus a person skilled in the art will be able to easily embody the technical spirit of the present disclosure. When it is determined that a detailed description of the well-known techniques in the art related to the present disclosure makes the gist of the present disclosure unnecessarily ambiguous in understanding the present disclosure, a detailed description thereof will be omitted. Hereinafter, exemplary embodiments of the present disclosure will be described with reference to the accompanying drawings.

Figure 1A:
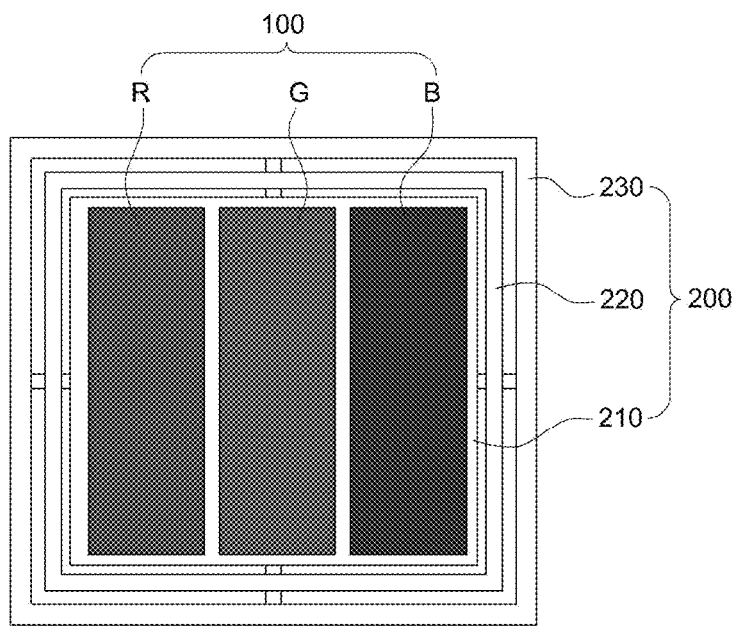
FIGS. 1A and 1B are diagrams illustrating a configuration of a dual mode function pixel according to an exemplary embodiment of the present disclosure.
Figure 1B:
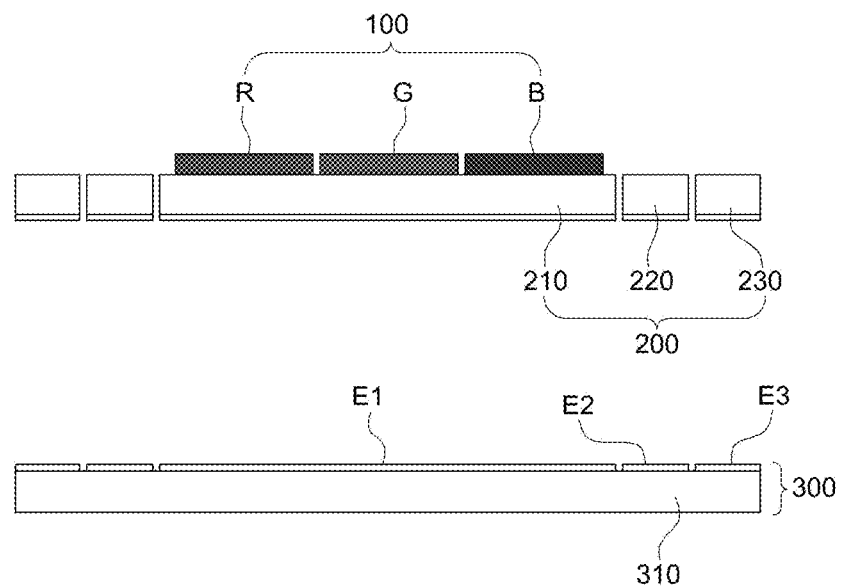

FIGS. 1A and 1B are diagrams illustrating a configuration of a dual mode function pixel according to an exemplary embodiment of the present disclosure. FIG. 1A is a plan view of the dual mode function pixel and FIG. 1B is a cross-sectional view of the dual mode function pixel.

As illustrated in FIGS. 1A and 1B, the dual mode function pixel includes a first membrane 210 on which a self-luminescent element 100 is formed, one or more membranes 220, 230 formed to surround the first membrane 210, and a lower layer 300 formed below the first membrane 210 and the one or more membranes 220, 230 to be spaced apart from the first membrane 210 and the one or more membranes 220, 230. The dual mode function pixel emits light by driving the self-luminescent element 100 in a first mode operation and selectively reflects projected light by using interference of light generated between the first to one or more membranes 210, 220, 230 and the lower layer 300 in a second mode operation.

Hereinafter, a case will be described in which the one or more membranes 220, 230 include a second membrane 220 that is formed to be spaced apart from the first membrane 210 and surround the first membrane 210, and a third membrane 230 that is formed to be spaced apart from the second membrane 220 and surround the second membrane 220. The number of membranes included in the one or more membranes 220, 230 may vary depending on a design.

Herein, the first to third membranes 210 to 230 may also be formed with transparent elements. When the first to third membranes 210 to 230 are formed with the transparent elements, light may leak into the lower layer 300 in a first mode and a second mode. Since the leakage of the light degrades the performance of the pixel, the lower layer 300 may be formed with an electrochromic element that interrupts (e.g., blocks) emission of light projected electrochromically in order to prevent the leakage of the light.

The dual mode function pixel according to the exemplary embodiment of the present disclosure is a single-structure pixel in which the self-luminescent element 100 that may self-emit or emit light and a MEMS structure 200 emitting light through interference and reflection of light are integrated into one pixel.

Hereinafter, a configuration and an operation of the dual mode function pixel will be described individually for a case in which the dual mode function pixel operates in the first mode and a case in which the dual mode function pixel operates in the second mode.

First, the dual mode function pixel may operate in the first mode when the intensity of light projected to the pixel is equal to or less than a threshold. Herein, the case in which the intensity of the light projected to the pixel is equal to or less than the threshold refers to a state in which the pixel is difficult to emit the light through interference and reflection of light projected from a periphery. The threshold may vary depending on a user's design. In the first mode, the self-luminescent element 100 is driven, and as a result, the pixel self-emits light without using the projected light. That is, the first mode is a mode in which the pixel self-emits light without using the light on the periphery.

The self-luminescent element 100 formed on the first membrane 210 included in the MEMS structure 200 may self-emit or emit light of red, green and blue colors. The self-luminescent element 100 emits light of one or more colors of the red, green and blue colors in the first mode. For the above operation, the self-luminescent element 100 may include an element R emitting the red light, an element G emitting the green light and an element B emitting the blue light. Herein, the self-luminescent element 100 may be an element adopting a transparent oxide and a thin-film transistor made of a transparent material.

As described above, since the lower layer 300 is formed with the electrochromic element which may electrochromically interrupt light, the light emitted by the self-luminescent element 100 may be guided so that all of the generated light is emitted in the upper part of the pixel without being leaked into the lower part of the pixel.

Second, the dual mode function pixel may operate in the second mode when the intensity of the light projected to the pixel is equal to or more than the threshold. Herein, the case in which the intensity of the light projected to the pixel is equal to or more than the threshold refers to a state in which the pixel may emit the light through the interference and reflection of the light projected from the periphery. The threshold may vary depending on the user's design. In the second mode, the MEMS structure 200 is driven to allow the pixel to cause the interference and reflection using the projected light to emit light. That is, the pixel emits light by using the light on the periphery in the second mode.

In more detail, the second mode refers to an operation mode in which light is selectively absorbed or reflected to emit light using the MEMS structure 200 that may cause an interference effect of light. The MEMS structure 200 may serve as a light modulator by inducing interferences with the membranes 210 to 230 that may be driven with voltage applied according to the projected light and electrodes E1 to E3 included in the lower layer 300 or a reflection layer 310. In the second mode of the operation, the pixel selectively absorbs and/or reflects light using an optical interference principle.

Figure 2A:
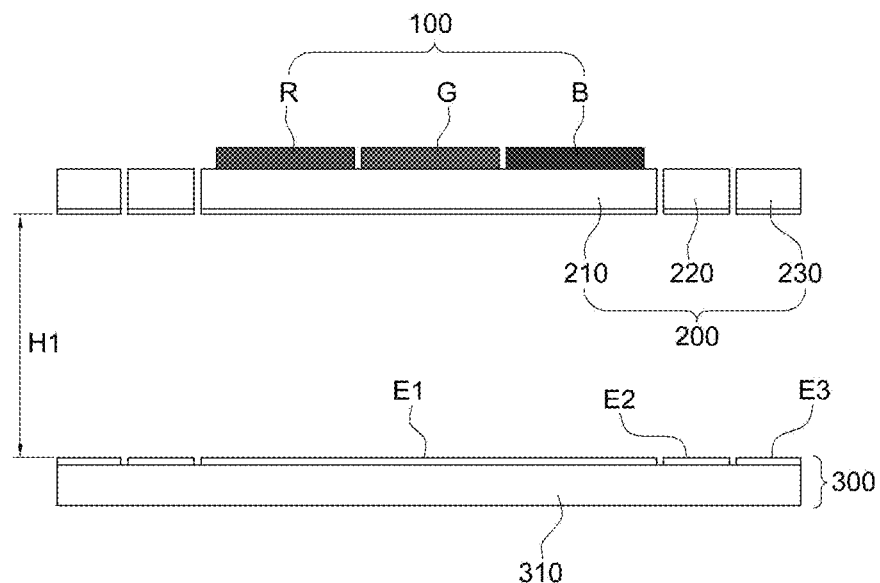
FIGS. 2A to 2C are diagrams describing a second mode operation of the dual mode function pixel of FIG. 1B.
Figure 2B:
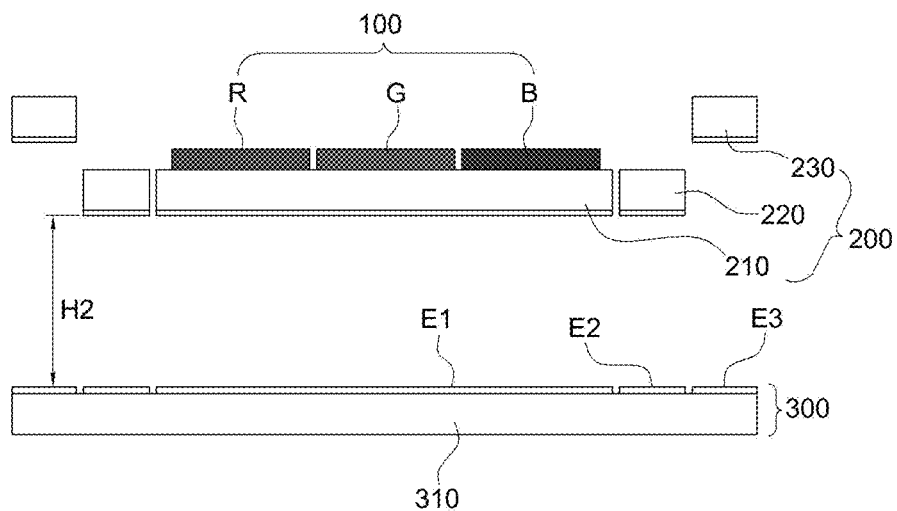
Figure 2C:
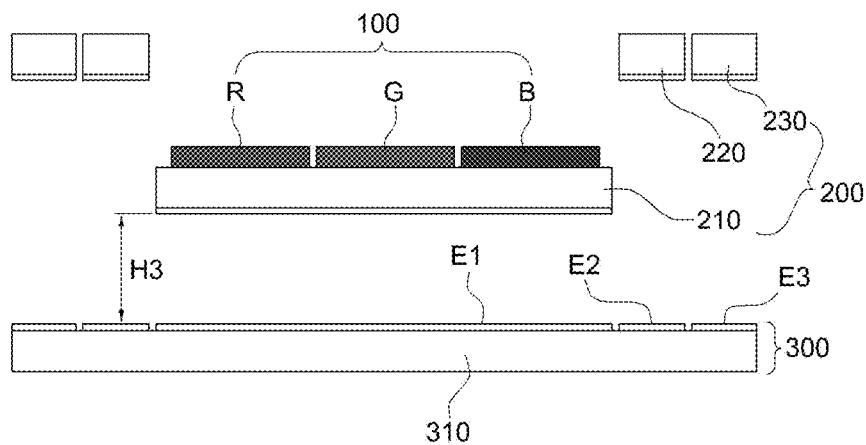

FIGS. 2A to 2C are diagrams describing a second mode operation of the dual mode function pixel of FIG. 1B.

In the second mode operation, the wavelength of light emitted from the pixel varies depending on the distance between the first to third membranes 210 to 230 included in the MEMS structure 200 and the lower layer 300. This is because an interference degree of the light according to the wavelength changes depending on the distances between the membranes and the lower layer 300.

Hereinafter, a case will be described in which the distance between the first membrane 210 and the lower layer 300 has three different values in the second mode operation. When the distance between the first membrane 210 and the lower layer 300 is changed, the interference degree is changed for each wavelength of light, and as a result, lights with three different wavelengths are selectively transmitted or reflected, thereby selecting the color of the light emitted by the pixel as an intended color.

FIG. 2A illustrates a case in which the distance between the first membrane 210 and the lower layer 300 corresponds to a first value H1. FIG. 2B illustrates a case in which the distance between the first membrane 220 and the lower layer 300 corresponds to a second value H2. FIG. 2C illustrates a case in which the distance between the first membrane 230 and the lower layer 300 corresponds to a third value H3. As such, when the distance between the first membrane 210 and the lower layer 300 is changed, the wavelength of the selectively interfered and reflected light is also changed. Therefore, the wavelengths of the selectively reflected light are different from each other in FIGS. 2A to 2C.

For the aforementioned operation, the lower layer 300 includes the first to third electrodes E1 to E3 formed at positions corresponding to the first to third membranes 210 to 230. That is, the first electrode E1 is formed at the position corresponding to the first membrane 210, the second electrode E2 is formed at the position corresponding to the second membrane 220, and the third electrode E3 is formed at the position corresponding to the third membrane 230. The distances between the first to third membranes 210 to 230 and the lower layer 300 are controlled according to the level of voltage applied to the first to third electrodes E1 to E3.

The pixel according to the present disclosure emits light in different modes according to the intensity of the light projected to the pixel. Therefore, a clear image may be provided and a high visibility is achieved regardless of the intensity of the light projected to the pixel. The self-luminescent element 100 is formed on the membrane 210 and the structure illustrated in the plan view of FIG. 1A is adopted to reduce the area.

Figure 3:
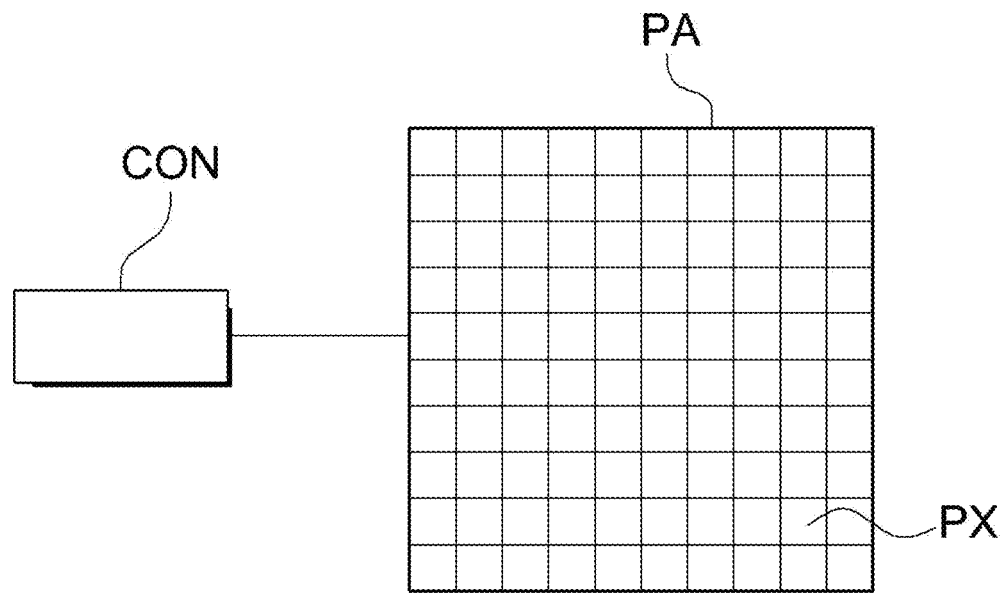
FIG. 3 is a configuration diagram of a dual mode function display according to an exemplary embodiment of the present disclosure.

FIG. 3 is a configuration diagram of a dual mode function display according to an exemplary embodiment of the present disclosure. The dual mode function display of FIG. 3 includes the plurality of dual mode function pixels of FIG. 1A.

As illustrated in FIG. 3, the dual mode function display includes a pixel array PA including the plurality of pixels PX that operates in a first mode in which the light is self-emitted or a second mode in which the projected light is selectively reflected, and a control unit CON controlling the plurality of pixels PX to operate either in the first mode or the second mode by sensing the intensity of the projected light.

Herein, configurations and operations of the plurality of pixels PX included in the pixel array PA are the same as described above in the description of FIGS. 1A, 1B and 2A to 2C. Therefore, the descriptions of the configuration and operation of each pixel PX are omitted, and an overall operation of the control unit CON and the dual mode function display will be primarily described.

The control unit CON determines whether the plurality of pixels PX included in the pixel array PA will operate either in the first mode or the second mode, and controls each pixel (PX) to operate according to the operation mode. The control unit CON senses the intensity of the light projected to the pixel array PA to control the plurality of pixels PX to operate in the first mode when the intensity of light projected to the pixel array PA is equal to or less than a threshold, and control the plurality of pixels PX to operate in the second mode when the intensity of the light projected to the pixel array PA is equal to or more than the threshold, by sensing the intensity of the light projected to the pixel array PA. Herein, meanings of the threshold, the first mode and the second mode are the same as described in the description of FIGS. 1A, 1B and 2A to 2C. For the above operation, the control unit CON may include a sensor configured to sense the intensity of light.

That is, the control unit CON drives the self-luminescent element 100 included in each pixel PX to emit light when the intensity of the light projected to the pixel array PA is equal to or less than the threshold, and drives the MEMS structure 200 and the lower layer 300 to allow the pixel to selectively reflect light using an interference phenomenon of the projected light when the intensity of the light projected to the pixel array PA is equal to or more than the threshold.

Though the present disclosure is specifically described in accordance with the exemplary embodiments of the present disclosure described above, it is to be noted that the exemplary embodiments are illustrative only and not intended to be limiting. Further, a skilled person in the art would understand that the various embodiments will be made without departing from the spirit of the present disclosure.

What is claimed is:

1. A dual mode function pixel, comprising:
a first membrane on which a self-luminescent element is formed;
one or more membranes formed to surround the first membrane; and
a lower layer formed below the first membrane and the one or more membranes to be spaced apart from the first membrane and the one or more membranes,
wherein the dual mode function pixel is controlled such that the self-luminescent element is driven either to emit light in a first mode operation or to selectively reflect a projected light by utilizing an interference of light generated between the first to one or more membranes and the lower layer in a second mode operation,
wherein the self-luminescent element is arranged with a reflective element in a vertical stack-up manner,
wherein the lower layer makes the light emitted by the self-luminescent element be guided so that all of the generated light is emitted in an upper part of the pixel without being leaked into the lower part of the pixel, and
wherein a wavelength of reflected light is changed according to a distance between the first membrane and the lower layer in the second mode operation;
wherein the lower layer is formed with an electrochromic element that electrochromically interrupts emission of the projected light.

2. The dual mode function pixel of claim 1, wherein the one or more membranes include:
a second membrane formed to be spaced apart from the first membrane and surround the first membrane; and
a third membrane formed to be spaced apart from the second membrane and surround the second membrane.

3. The dual mode function pixel of claim 2, wherein the dual mode function pixel operates in the first mode when the intensity of the projected light is equal to or less than a threshold value and operates in a second mode when the intensity of the projected light is equal to or more than the threshold value.

4. The dual mode function pixel of claim 2, wherein the lower layer includes first to third electrodes formed at positions corresponding to the first to third membranes.

5. The dual mode function pixel of claim 2, wherein the first to third membranes are driven with a voltage applied according to the projected light.

6. The dual mode function pixel of claim 2, wherein the self-luminescent element emits light of one or more colors of red, green and blue colors when the self-luminescent element operates in the first mode.

7. The dual mode function pixel of claim 2, wherein each of the first to third membranes is formed with a transparent element.

8. The dual mode function pixel of claim 1, wherein the distances between the first to third membranes and the lower layer are controlled according to the level of voltage applied to the first to third electrodes.

9. A dual mode function display, comprising:
a pixel array including a plurality of pixels that operate either in a first mode in which light is self-emitted or in a second mode in which a projected light is selectively reflected; and
a control unit configured to sense intensity of the projected light to control the plurality of pixels to operate either in the first mode or in the second mode;
wherein each of the plurality of pixels includes a self-luminescent element, first to one or more membranes and a lower layer, and is controlled such that the self-luminescent element is driven either to emit light in a first mode operation or to selectively reflect a projected light by utilizing an interference of light generated between the first to one or more membranes and the lower layer in a second mode operation,
wherein the self-luminescent element is arranged with a reflective element in a vertical stack-up manner,
wherein the lower layer makes the light emitted by the self-luminescent element be guided so that all of the generated light is emitted in an upper part of the pixel without being leaked into the lower part of the pixel, and
wherein:
a wavelength of reflected light is changed according to a distance between the first membrane and the lower layer in the second mode operation;
the self-luminescent element is formed on the first membrane;
a second membrane is formed to be spaced apart from the first membrane and surround the first membrane;
a third membrane is formed to be spaced apart from the second membrane and surround the second membrane; and
the lower layer is formed below the first to third membranes;
wherein the lower layer is formed with an electrochromic element that electrochromically interrupts emission of the projected light.

10. The dual mode function display of claim 9, wherein the control unit controls the plurality of pixels to operate in the first mode when the intensity of the projected light is equal to or less than a threshold value and controls the plurality of pixels to operate in the second mode when the intensity of the projected light is equal to or more than the threshold value.

11. The dual mode function display of claim 9, wherein the lower layer includes first to third electrodes formed at positions corresponding to the first to third membranes.

12. The dual mode function display of claim 9, wherein the first to third membranes are driven with a voltage applied according to the projected light.

13. The dual mode function display of claim 9, wherein the self-luminescent element emits light of one or more colors of red, green and blue colors when the self-luminescent element operates in the first mode.

14. The dual mode function display of claim 9, wherein the distances between the first to third membranes and the lower layer are controlled according to the level of voltage applied to the first to third electrodes.

15. The dual mode function display of claim 9, wherein each of the first to third membranes is formed with a transparent element.

* * * * *